(12) United States Patent
Voll et al.

(10) Patent No.: US 6,607,032 B2
(45) Date of Patent: Aug. 19, 2003

(54) MULTI-LAYER SCREEN AND DOWNHOLE COMPLETION METHOD

(75) Inventors: Benn A. Voll, Houston, TX (US); Elmer R. Peterson, Lafayette, LA (US); Simon Angelle, Arnaudville, LA (US); Ken Dyson, St. Martinville, LA (US); John L. Baugh, Houston, TX (US); John T. Broome, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/947,868

(22) Filed: Sep. 6, 2001

(65) Prior Publication Data

US 2002/0084070 A1 Jul. 4, 2002

Related U.S. Application Data

(60) Provisional application No. 60/287,626, filed on Apr. 30, 2001, provisional application No. 60/236,484, filed on Sep. 29, 2000, and provisional application No. 60/231,627, filed on Sep. 11, 2000.

(51) Int. Cl.[7] .............................................. E21B 43/08
(52) U.S. Cl. .......................... 166/227; 166/206; 166/51
(58) Field of Search ....................... 166/278, 51, 207, 166/209, 210, 217, 277, 56, 227, 230, 231

(56) References Cited

U.S. PATENT DOCUMENTS

| 2,858,894 A | 11/1958 | Akeyson |
| 3,297,092 A | 1/1967 | Jennings |
| 3,746,091 A * | 7/1973 | Owen et al. ................. 166/207 |
| 4,975,128 A * | 12/1990 | Schmitz ....................... 148/127 |
| 5,293,935 A | 3/1994 | Arterbury et al. |
| 5,348,095 A | 9/1994 | Worrall et al. |
| 5,366,012 A | 11/1994 | Lohbeck |
| 5,611,399 A | 3/1997 | Richard et al. |
| 5,642,781 A * | 7/1997 | Richard ....................... 166/231 |
| 5,667,011 A | 9/1997 | Gill et al. |
| 5,901,789 A | 5/1999 | Donnelly et al. |
| 5,979,551 A * | 11/1999 | Uban et al. .................. 166/233 |
| 6,012,522 A | 1/2000 | Donnelly et al. |
| 6,250,385 B1 | 6/2001 | Montaron |
| 6,263,966 B1 | 7/2001 | Haut et al. |
| 6,315,040 B1 | 11/2001 | Donnelly |
| 6,415,509 B1 * | 7/2002 | Echols et al. ............. 29/896.62 |
| 6,454,013 B1 * | 9/2002 | Metcalfe ..................... 166/382 |
| 6,457,518 B1 * | 10/2002 | Castano-Mears et al. ... 166/207 |

* cited by examiner

Primary Examiner—Frank Tsay
(74) Attorney, Agent, or Firm—Steve Rosenblatt

(57) ABSTRACT

A downhole completion method and an expandable filtration apparatus are disclosed. The filter assembly comprises a plurality of layers beginning with a coated perforated base pipe. The coating reduces the force required for expansion. A drainage layer overlays the base pipe with the filtration layer above it. The drainage layer improves flow through the filtration layer and protects it from burrs in the base pipe. A filtration enhancement layer fits over the filtration layer and an outer shroud protects the assembly during run in. The assembly can be used as made or expanded downhole in one or a series of expansions.

25 Claims, 3 Drawing Sheets

MULTI-LAYER SCREEN AND DOWNHOLE COMPLETION METHOD

PRIORITY INFORMATION

This application claims the benefit of U.S. Provisional Application Nos. 60/231,627, filed on Sep. 11, 2000, 60/236,484, filed on Sep. 29, 2000, and 60/287,626, filed on Apr. 30, 2001.

FIELD OF THE INVENTION

The field of this invention relates to downhole screens, which can be expanded into contact with the formation.

BACKGROUND OF THE INVENTION

Downhole screens are used in a variety of different applications. As part of a common procedure called gravel packing, the screens are deposited adjacent the producing formation and the surrounding annular space is filled with sand known as gravel. Various fabrication techniques have been developed for manufacturing such screens and a typical example is illustrated in U.S. Pat. No. 5,611,399.

More recently it has been determined that it is desirable to reduce the size of the annular space between the screen and the formation. Reduction of the volume of the annular space around the screen discourages fluid flow along the screen, which, in turn, lessens the production of sand. In order to be able to produce the reservoir longer, it has been desirable to insert screens in well bores or laterals and thereafter expand them. A good example of the expansion techniques for a downhole screen is shown in U.S. Pat. No. 6,012,522. In this patent, overlapping segments of screen are placed on a base pipe, which is ultimately expanded from within when placed in position in the well bore or a lateral. The shortcoming of this technique is that portions of the filtering material must be moved relative to each other which subjects them to tearing which in turn can result in a failure of the expanded screen assembly to control the production of sand. Another shortcoming of such designs is the limited capacity to withstand collapse.

Other patents relating to pipe expansions are: U.S. Pat. Nos. 5,901,789 and 5,366,012.

The main objective of the present invention is to allow easy installation of the screen to the desired location followed by expansion to reduce the volume of the annular space around the screen. Yet another object of the invention is to expand the screen against the formation to entirely eliminate the annular space around it. Yet another objective of the present invention is to allow the use of the structure of the screen downhole even without expansion. Another objective of the present invention is to decrease the amount of stress on the filtration member when expanded. Yet another objective of the present invention is to provide a significantly stronger structure for the finished product, which even after expansion presents a greater resistance to collapse. Another object of the invention is to provide, as much as possible, uniformity in the opening size of the filtration layer after the assembly is expanded. Another objective is to provide sufficient strength in the assembly, after expansion to allow it to better resist differential pressures. Still another objective is to reduce the effort required for expansion and to stage the overall expansion in discrete steps. These and other advantages of the present invention will be appreciated by those skilled in the art from a review of the description of the preferred embodiment, which appears below.

SUMMARY OF THE INVENTION

A downhole completion method and an expandable filtration apparatus are disclosed. The filter assembly comprises a plurality of layers beginning with a coated perforated base pipe. The coating reduces the force required for expansion. A drainage layer overlays the base pipe with the filtration layer above it. The drainage layer improves flow through the filtration layer and protects it from burrs in the base pipe. A filtration enhancement layer fits over the filtration layer and an outer shroud protects the assembly during run in. The assembly can be used as made or expanded downhole in one or a series of expansions.

DETAILED DESCRIPTION OF THE PREFERRED EMBODIMENT

Figure 1A:
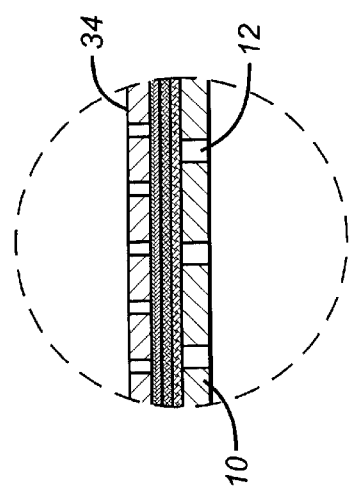
FIG. 1 is cutaway view, partly in section, showing the filter assembly.
Figure 1:
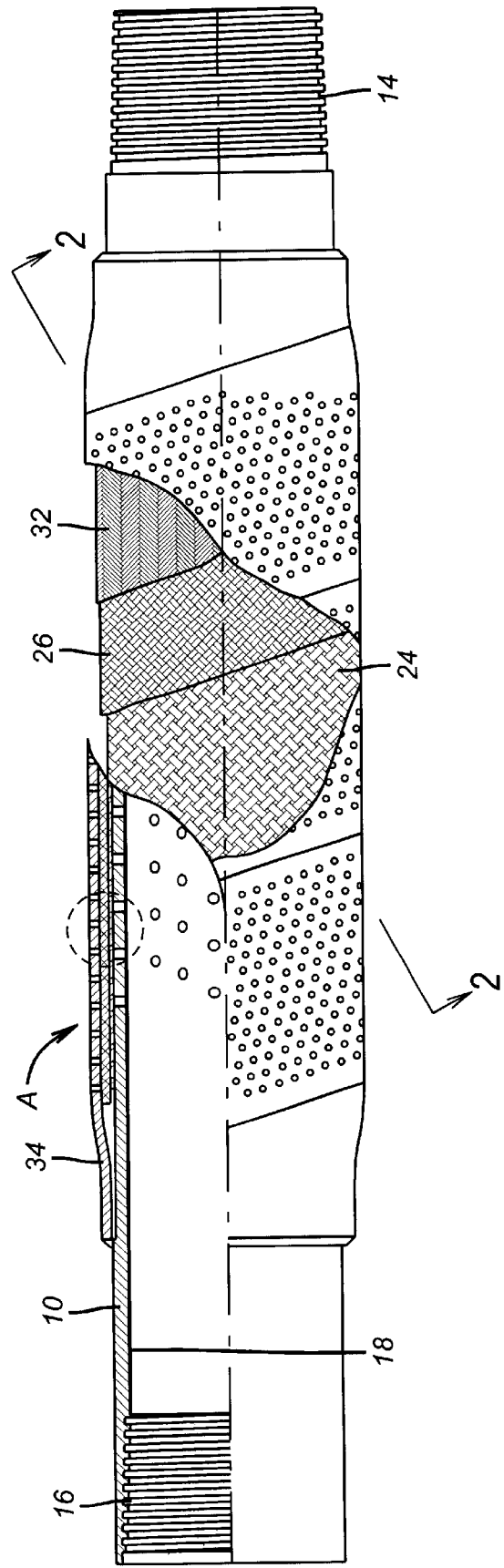
Figure 2:
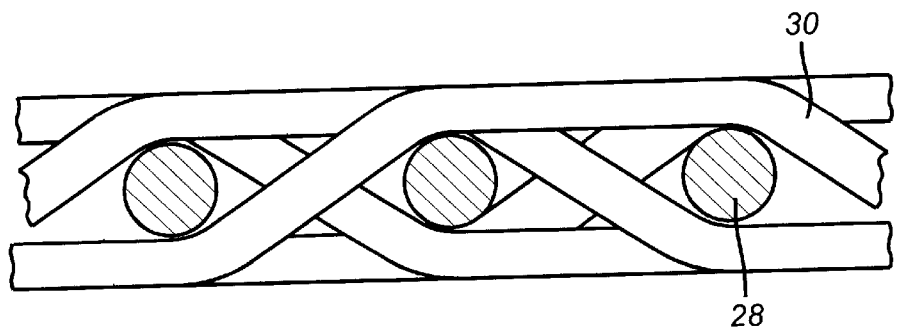
FIG. 2 is a section view along lines 2—2 of FIG. 1.

Referring to FIG. 1, the various layers of the preferred embodiment are shown. The innermost layer is a perforated base pipe 10, which has a plurality of openings 12. Base pipe 10 provides a firm foundation for the layers above. The pattern of the holes 12 is optimized to strike the best balance between collapse resistance after expansion and minimization of the force required to expand this layer and those positioned outside it, as will be described below. This optimization allows expansions in the range of up to about 30%. The base pipe 10 can have threads 14 and 16 at opposite ends to allow sections of the filter assembly A to be secured together, giving greater torsion and tension strength for the filter assembly A. A coating 18 made preferably from a plastic material can be applied to the inside of the base pipe 10. The Whitford Corp. manufactures the coating under the name Xylan 1052.Ultimately, when an expander 20 (see FIG. 3) is moved through base pipe 10, the coating 18 will reduce the required expansion force. The greater collapse resistance of the base pipe 10 promotes borehole stability after expansion. The optimization of the openings 12 promotes the highest expansion rate for a given material for base pipe 10 while still leaving sufficient inflow area through the pipe openings or perforations 12. Using round, rounded, or oval opening instead of slots provides for a mechanically stronger filter assembly A. In the preferred embodiment, the coating 18 is Xylan and it can provide a reduction in required force for a given expansion by as much as 50%. The coating 18 also helps resistance to galling by the expander 20 or a subsequent expander such as 22 (see FIG. 4).

Mounted above the base pipe 10 is a drainage layer 24. Drainage layer 24 is between base pipe 10 and filtration layer 26. The drainage layer 24 promotes flow between the filtration layer 26 and the openings 12 of the base pipe 10. In the preferred embodiment, the drainage layer 24 is a weave, selected from a broad array of metals. A braided weave design is currently preferred, although other weave patterns can be used. The preferred material is available from Jersey Hose as—6" 304 SS Braid 600-304B. The drainage layer 24 protects the filtration layer 26 from burrs or puckers around the edges of openings 12. In the event of high differential pressures due to production, the presence of the drainage layer 24 provides structural support for the filtration layer 26. The braided wire drainage layer 24 could be substituted with a shroud of some type, akin to outer shroud 34, that would have standoff from the base pipe 10.

Mounted over the drainage layer 24 is the filtration layer 26. The filtration layer 26 has uniform openings. The preferred material is a special type of Twill Dutch weave. This material gives very reliable uniformity to the opening size, after expansion. In this manner there can be confidence in the particle size, which will not pass filtration layer 26 while giving greater protection against plugging or the passage of too many particles. As shown in FIG. 1, the filtration layer 26 is oriented at an angle to the longitudinal axis of the filter assembly A. This angle can be in the range of about 10 to about 80 degrees with about 20 degrees being preferred. Orienting the filtering layer 26 at an angle allows minimization of change in opening size and uniformity, resulting from expansion. The Dutch Twill weave provides greater durability and particle holding capacity. Negative effects on hole size and uniformity as a result of expansion are further minimized by using a reverse weave Twill Dutch pattern. A reverse weave is one where the diameter of the weft (shute) wires 28 is larger than the warp wires 30 by as much as about 50 percent. The combination of the angular placement of the filtration layer 26 by a spiral winding technique coupled with a reverse weave yields a more predictable and uniform opening size after expansion.

Figure 5:
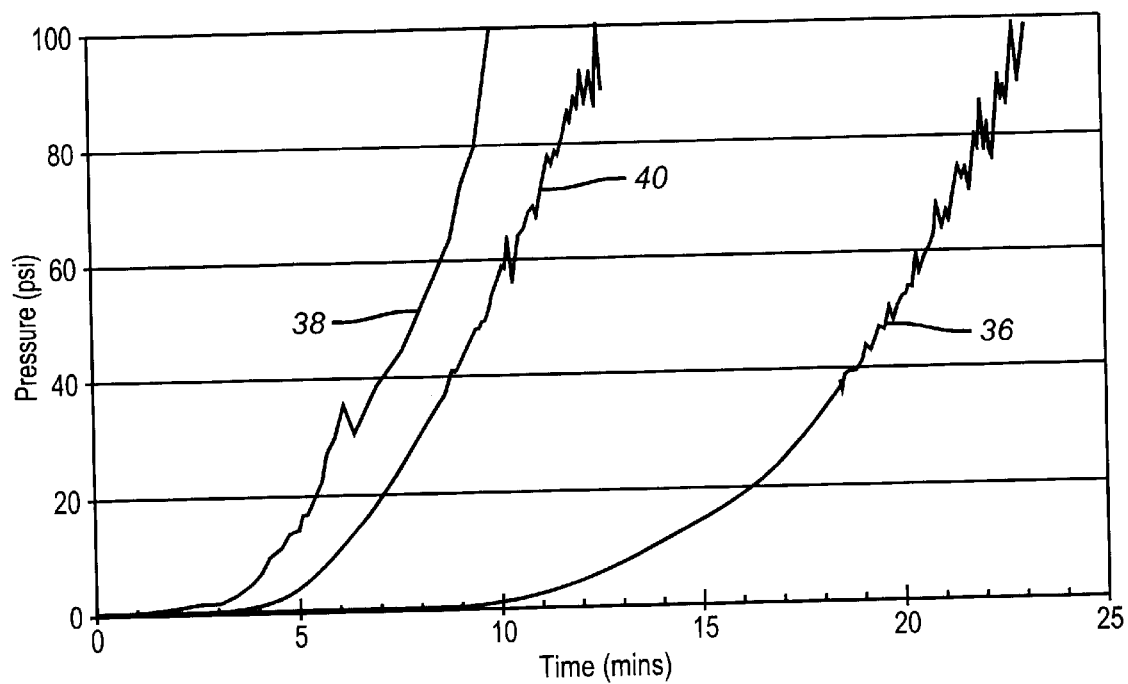
FIG. 5 is a comparison performance chart comparing a known filter made by Baker Hughes called Excluder and two variations of the filter of the present invention.

Mounted over the filtration layer 26 is the filtration enhancement layer 32. This layer promotes greater flow conductivity from the outermost layer, the outer shroud 34. Layer 32 acts as a coarse filter to layer 26 and prolongs the life of filtration layer 26. This can be seen in the graph of FIG. 5, where the addition of the filtration enhancement layer is curve 36. The same filter assembly A of the present invention but without the filtration enhancement layer 32 is illustrated by curve 38. Curve 40 represents the performance of a known product made by Baker Hughes called Excluder. FIG. 5 readily demonstrates that the addition of the filtration enhancement layer 32 nearly triples the time it takes to build up a backpressure of 40 PSIG for the same flow conditions. Leaving out the filtration enhancement layer 32 also makes that version of the present invention perform somewhat comparably to the known Excluder design. Several different weave types are suitable for layer 32 such as: square weave, Compound Balanced, Tight Tuck, and Braided Weave. A suitable Compound Balanced material is available from Porous Metal Products, model #CB-3-96-192-21/24. A metallic material is preferred.

The outer shroud 34 is preferably formed from spirally winding a perforated sheet into a tube. The hole size and pattern is optimized to facilitate expansion and yet provide sufficient collapse resistance in the expanded state. It is desired to have the inflow area of the openings maximized but to limit the opening size and use a staggered pattern so that the outer shroud will not buckle or tear, when expanded. The primary purpose of the outer shroud 34 is to protect the layer below from damage during run in.

The layers can be joined together by swaging to reduce the outside diameter of the filter assembly A. Swaging also makes the various layers act as one with regard to expansion and provides greater strength against collapse after expansion. It is preferred to anneal the components individually before swaging or to anneal the filtration assembly A after all the components have been assembled. Doing this permits a greater degree of expansion without failure. This benefit is particularly applicable to the base pipe 10. The type of annealing envisioned is solution annealing to 1800 degrees F. Annealing of the base pipe 10 is done before applying the coating 18 due to the inability of the coating 18 to withstand the annealing temperatures. Sintering can be used instead of swaging to join the layers together. The layers are preferably assembled in the following manner: the braided wire of suitable drainage layer 24 is placed on the base pipe 10 which has previously been drilled with holes, coated and threaded. Then, the filtration layer 26 is wrapped at an angle over the top of the drainage layer 24. Another layer, called the filtration enhancement layer 32 is placed over the top of the filtration layer 26. Then, an outer shroud 34 is placed over the filtration enhancement layer 32 and the total package is run through a set of dies that swages or forces all components to vigorously contact each other.

Figure 3:
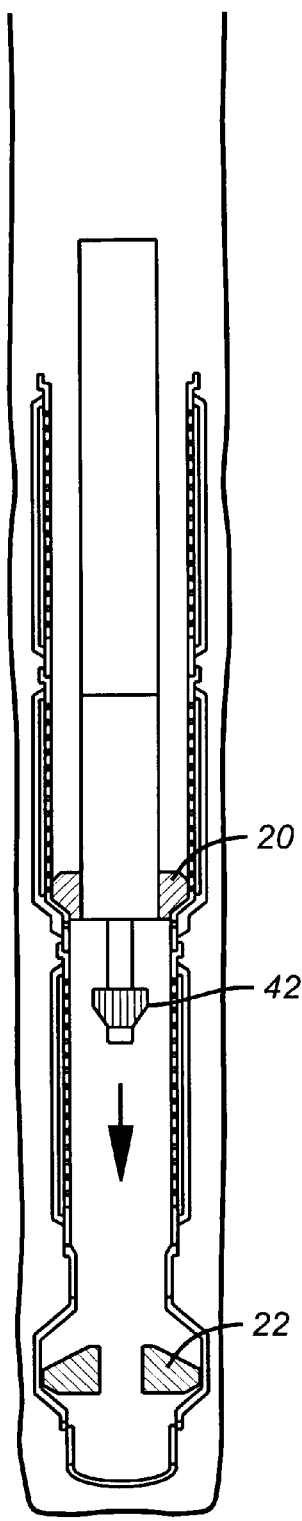
FIG. 3 is a section view of a first step in a multi step expansion of the filter assembly.
Figure 4:
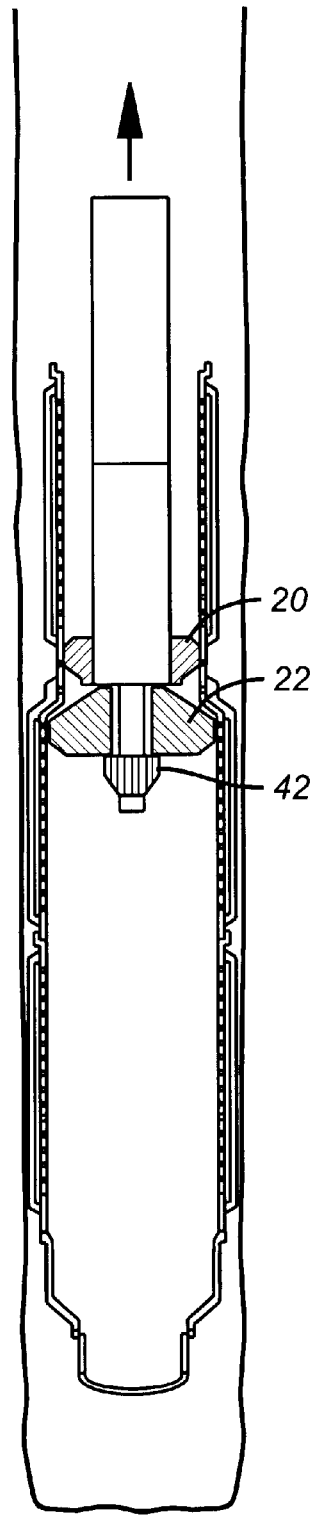
FIG. 4 is a section view of a second step in a multi step expansion of the filter assembly

The filter assembly A has the advantage of superior performance, whether it is expanded downhole or not. If it is not expanded, it can be gravel packed in the known manner. FIGS. 3 and 4 illustrate a unique step-wise expansion technique. In a first step, an expander 20 which may be a fixed cone or a cone with variable diameter is moved downwardly through the filter assembly A to achieve about a 15% expansion. At the lower end of the filter assembly A a cone latch 42 engages a fixed or variable diameter expander or cone 22 to increase the overall expansion to as much as 50%. As previously stated, more expansion steps can be used and different degrees of step-wise expansion and overall expansion can be obtained with this technique. It should be noted that the second expansion does not necessarily have to proceed in a direction opposite the first expansion.

There are many applications of the filter assembly of the present invention. In horizontal open hole completions there are usually more than 1,000 feet of contact with the productive formation, sometimes in excess of 9,000'. Because there is so much contact the amount of production per foot is very low. In most cases if the theoretical production per foot was traveling into a screen directly opposite of the formation then the velocity would be too low to transport sand from unconsolidated formations or cause erosion. There are many wells in which erosion is taking place and sand is being produced. Presently there are a couple of theories that explain this occurrence. First the formations may be so unconsolidated that they simply fall apart when the pressure in the well bore used to control the well during drilling and completing the well is removed. This is referred to as hole or formation collapse. A second possibility is that fluid flows along the path of least resistance. This may be on the inside of a screen that is in place or along the outside. As the flow proceeds towards the beginning of the open hole section, the accumulative effects of production means the velocity is much higher towards the top section (beginning) of the open hole. This velocity (accumulated flow) can be high enough on the outside of the screen to transport sand and to erode the formation and screen.

By expanding screen in an open hole horizontal well the annulus between the screen and the formation can be greatly reduced or even eliminated. Reduction of the annulus means greater resistance to flow and therefore production flow is reduced on the exterior of the screen and increased on the interior. The reduction in exterior flow means lower velocities near the well bore and therefore less sand transportability and less erosion effects.

Expansion can also aid in formation stability by physically supporting the formation if the screen is expanded until it is touching the formation. This support in turn could prevent the collapsing of the formation when the pressure in the well bore is reduced.

In cased hole applications filtration assembly A offers the advantage of a large inside diameter for remedial work below its installation. Another advantage is that in frac packs and gravel packs all that is necessary to do is to place the proppant or sand in the perforation tunnels and formation fractures. Annular packs between the screen and the casing, which are often difficult to achieve, are not necessary since expanding screen removes this annulus. The filter apparatus A could also be used in conjunction with a frac pack or gravel pack and subsequently expanded to back fill any voids in the annulus pack or perforations not filled.

We claim:

1. An expandable filter assembly for downhole use, comprising:
   a base pipe having an inside surface, a longitudinal axis, and a plurality of openings;
   at least one filtration layer mounted over said base pipe, said at least one filtration layer being annealed to facilitate subsequent expansion downhole.

2. The assembly of claim 1, wherein:
   said at least one filtration layer and said base pipe are individually annealed prior to being joined together.

3. The assembly of claim 1, wherein:
   said at least one filtration layer and said base pipe are annealed after being joined together.

4. The assembly of claim 1, wherein:
   said at least one filtration layer and said base pipe are swaged together and said annealing further comprises solution annealing at up to about 1800 degrees F.

5. The assembly of claim 1, wherein:
   said inside surface of said base pipe is coated to reduce the force needed for subsequent expansion.

6. The assembly of claim 5, further comprising:
   an expander capable of multi-stage expansion of said base pipe and said at least one filtration layer.

7. The assembly of claim 6, wherein:
   said staged expansion occurs in a single direction.

8. The assembly of claim 6, wherein:
   said staged expansion occurs in opposed directions.

9. The assembly of claim 6, wherein:
   said base pipe is expanded in stages up to about 30% above its original dimension.

10. The assembly of claim 6, wherein:
    said at least one filtration layer comprises a weave having weft and warp wires and wherein one of said weft and warp wires is disposed at an angle of about 10–80 degrees with respect to the longitudinal axis of said base pipe.

11. The assembly of claim 10, wherein:
    said weft wires have a larger diameter than said warp wires by as much as about 50%.

12. The assembly of claim 10, wherein:
    said at least one filtration layer further comprises a woven drainage layer on said base pipe and a main filtration layer, said drainage layer protecting said main filtration layer from burrs in openings in said base pipe and providing mechanical support for said main filtration layer.

13. The assembly of claim 12, further comprising:
    a filtration enhancement layer mounted over said main filtration layer and further comprising a weave, said drainage layer and said filtration enhancement layer are spirally wound to orient wires therein in substantial alignment with said wires in said main filtration layer.

14. The assembly of claim 10, wherein:
    said openings in said base pipe are round, rounded or oval.

15. An expandable filter assembly for downhole use, comprising:
    a base pipe having an inside surface, a longitudinal axis, and a plurality of openings;
    at least one filtration layer mounted over said base pipe,
    said inside surface of said base pipe is coated to reduce the force needed for subsequent expansion.

16. The assembly of claim 15, wherein:
    said coating is made of a plastic material and said openings are round, rounded or oval.

17. The assembly of claim 15, further comprising:
    an expander capable of multi-stage expansion of said base pipe and said at least one filtration layer.

18. The assembly of claim 17, wherein:
    said at least one filtration layer comprises a weave having weft and warp wires and wherein one of said weft and warp wires is disposed at an angle of about 10–80 degrees with respect to the longitudinal axis of said base pipe.

19. The assembly of claim 18, wherein:
    said at least one filtration layer and said base pipe each being annealed to facilitate subsequent expansion downhole;
    said at least one filtration layer and said base pipe are swaged together and said annealing further comprises solution annealing at up to about 1800 degrees F.

20. An expandable filter assembly for downhole use, comprising:
    a base pipe having an inside surface, a longitudinal axis, and a plurality of openings;
       at least one filtration layer mounted over said base pipe; and
       an expander capable of multi-stage expansion of said base pipe and said at least one filtration layer.

21. The assembly of claim 20, wherein:
    said base pipe is expanded in stages up to about 30% above its original dimension.

22. The assembly of claim 20, wherein:
    said at least one filtration layer and said base pipe are annealed to facilitate subsequent expansion downhole;
    said at least one filtration layer and said base pipe are swaged together and said annealing further comprises solution annealing at up to about 1800 degrees F.

23. The assembly of claim 22, wherein:
    said at least one filtration layer comprises a weave having weft and warp wires and wherein one of said weft and warp wires is disposed at an angle of about 10–80 degrees with respect to the longitudinal axis of said base pipe.

24. An expandable filter assembly for downhole use, comprising:
    a base pipe having an inside surface, a longitudinal axis, and a plurality of openings;
    at least one filtration layer mounted over said base pipe,
    said at least one filtration layer comprises a weave having weft and warp wires and wherein one of said weft and warp wires is disposed at an angle of about 10–80 degrees with respect to the longitudinal axis of said base pipe.

25. The assembly of claim 24, wherein:
    said weft wires have a larger diameter than said warp wires by as much as about 50%.

* * * * *